United States Patent
Perahia et al.

[11] Patent Number: 6,070,074
[45] Date of Patent: May 30, 2000

[54] METHOD FOR ENHANCING THE PERFORMANCE OF A REGENERATIVE SATELLITE COMMUNICATIONS SYSTEM

[75] Inventors: Eldad Perahia, Hermosa Beach; Donald C. Wilcoxson, Redondo Beach; Chamroeun Kchao, San Jose, all of Calif.

[73] Assignee: TRW Inc., Redondo Beach, Calif.

[21] Appl. No.: 09/066,069

[22] Filed: Apr. 24, 1998

[51] Int. Cl.[7] .................................................. H04Q 7/20
[52] U.S. Cl. .......................... 455/430; 455/13.4; 455/9; 455/69; 370/318
[58] Field of Search .................................. 455/504, 505, 455/506, 12.1, 13.4, 430, 69, 10, 9, 427, 428, 429; 370/317, 318

[56] References Cited

U.S. PATENT DOCUMENTS

| | | | |
|---|---|---|---|
| 4,228,538 | 10/1980 | Scharla-Nielsen et al. | 455/9 |
| 4,261,054 | 4/1981 | Scharla-Nielsen | 455/69 |
| 4,309,764 | 1/1982 | Acampora | 455/13.4 |
| 4,752,967 | 6/1988 | Bustamante et al. | 455/13.4 |
| 4,777,653 | 10/1988 | Bonnerot et al. | 455/69 |
| 5,128,965 | 7/1992 | Henriksson | 455/69 |
| 5,386,589 | 1/1995 | Kanai | 455/69 |
| 5,446,756 | 8/1995 | Mallinckrodt | 455/423 |
| 5,511,079 | 4/1996 | Dillon | 714/774 |
| 5,727,033 | 3/1998 | Weaver et al. | 455/69 |
| 5,768,684 | 6/1998 | Grubb et al. | 455/13.4 |
| 5,815,796 | 9/1998 | Armstrong et al. | 455/10 |
| 5,864,547 | 1/1999 | Strodtbeck et al. | 370/318 |
| 5,878,329 | 3/1999 | Mallinckrodt | 455/69 |
| 5,881,367 | 3/1999 | Calot et al. | 455/69 |
| 5,924,015 | 7/1999 | Garrison et al. | 455/13.4 |
| 5,956,619 | 9/1999 | Gallagher et al. | 455/12.1 |

OTHER PUBLICATIONS

Quality Estimation of PSK Modulated Signals, Celandroni et al., IEEE Communications Magazine, Jul. 1997.

*Primary Examiner*—Fan Tsang
*Assistant Examiner*—Rafael Perez-Gutierrez
*Attorney, Agent, or Firm*—Michael S. Yatsko

[57] ABSTRACT

A method for enhancing the performance of a communications system is disclosed. The system generally includes an originating ground station (300) which produces error-control coded uplink signals and transmits the coded uplink signals to a satellite (310). The system also includes a destination ground station (326) which receives a downlink beam from the satellite (310). The method includes the steps of receiving uplink signals transmitted by an originating ground station (300) at a destination ground station (326) and determining a downlink channel signal quality indication (504) at the destination ground station (326). The method also includes the steps of measuring an error rate associated with at least a portion of a downlink beam at said destination ground station (326) and determining an operating point (506) relative to a desired performance curve (502) based on the signal quality indication (504) and the error rate. At least one signal processing parameter of said originating ground station (300) is adjusted based on the operating point (506) when said operating point (506) lies in a predetermined region relative to the performance curve (502).

17 Claims, 4 Drawing Sheets

Flowchart of Adaptation Algorithm Using
Ground-Terminal-Only Measurement

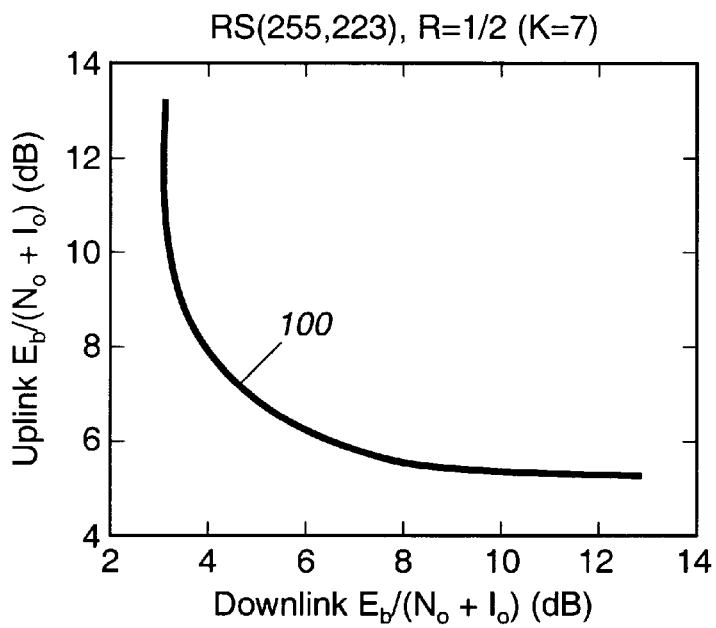
Figure 1. U/L $E_b/(N_o+I_o)$ vs. D/L $E_b/(N_o+I_o)$ Relationship for BER of $10^{-10}$ to the User (Coherent QPSK Demod on S/C and Ground, Soft Decision Viterbi Decoding at Ground)
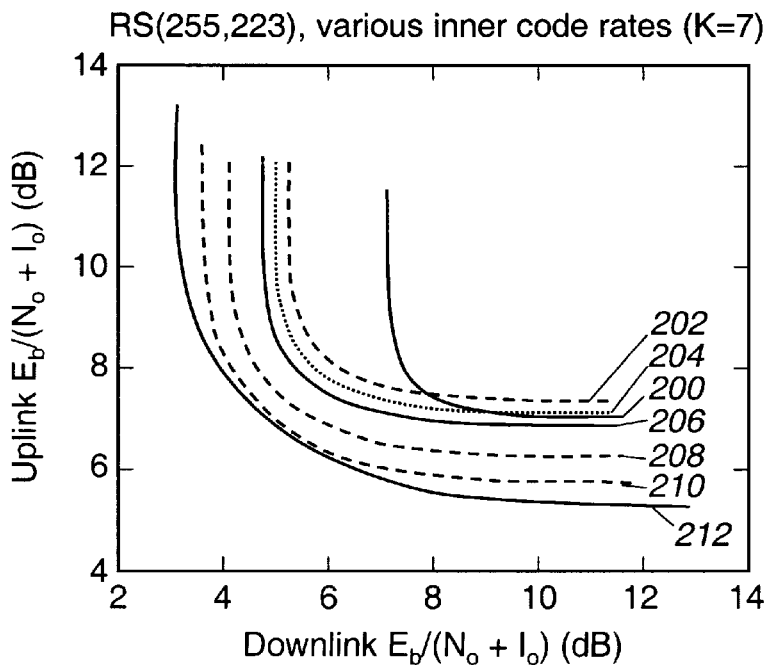
Figure 2. U/L $E_b/(N_o+I_o)$ vs. D/L $E_b/(N_o+I_o)$ Relationship for BER of $10^{-10}$ to the User (Coherent QPSK Demod on S/C and Ground, Soft Decision Viterbi Decoding at Ground) for Various Inner Codes

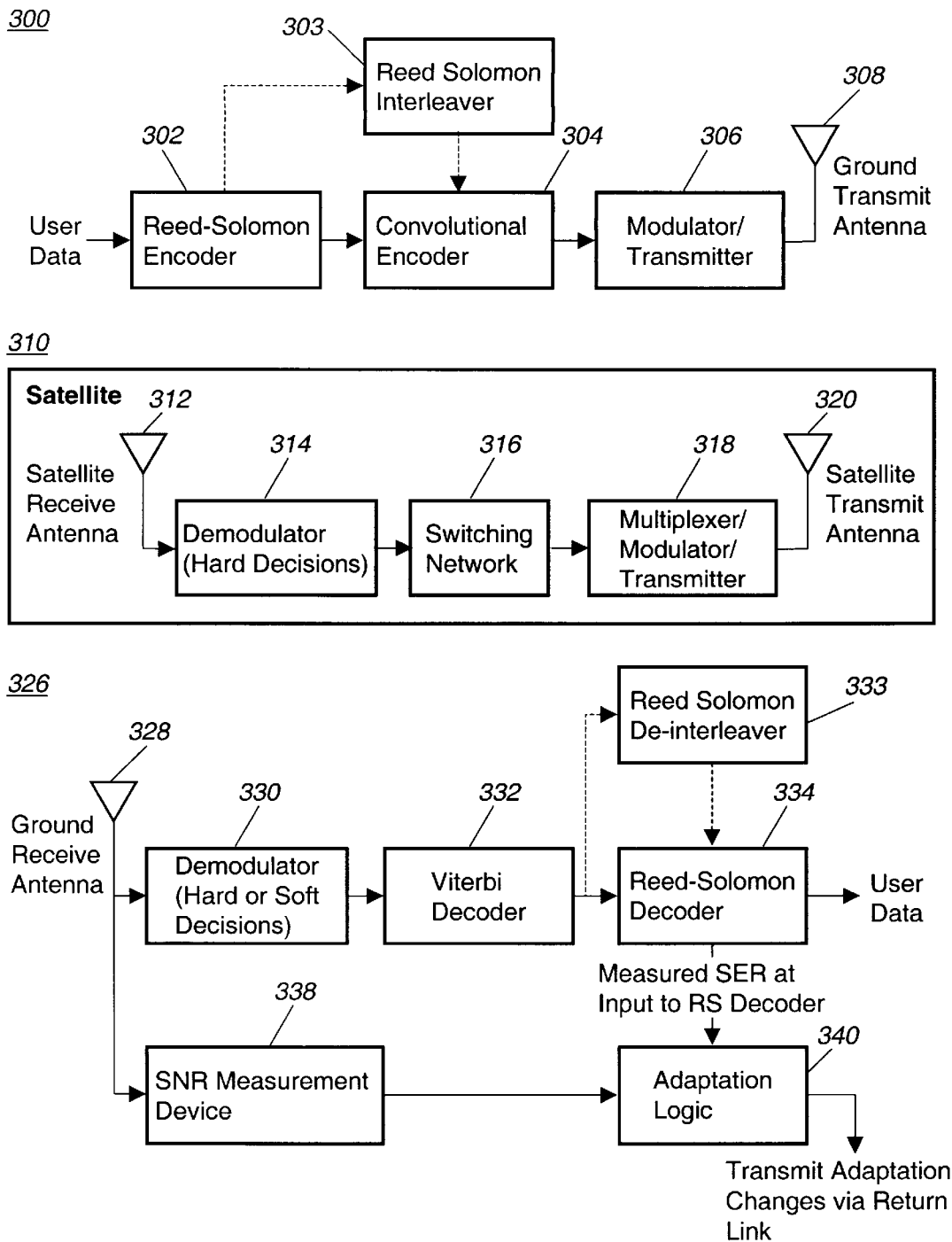
Figure 3. Block Diagram of Adaptation Method Implementation

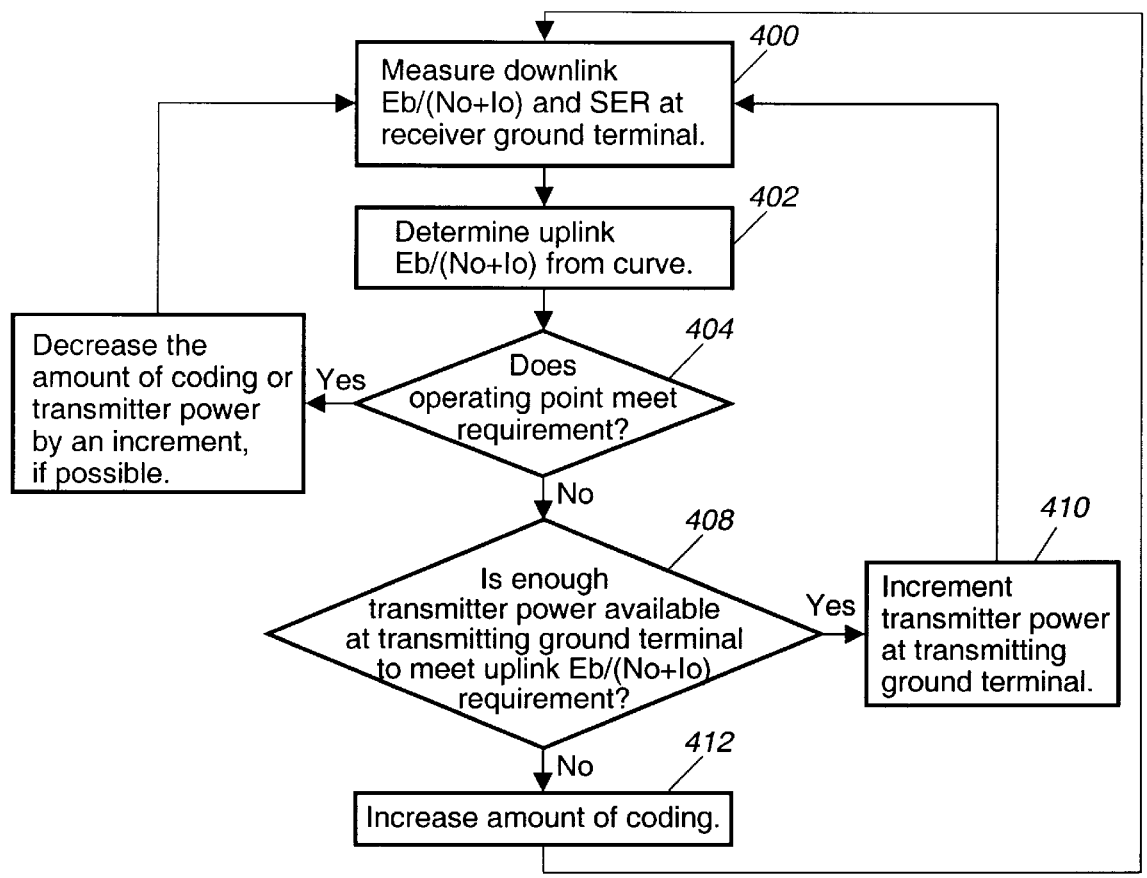
Figure 4. Flowchart of Adaptation Algorithm Using Ground-Terminal-Only Measurement
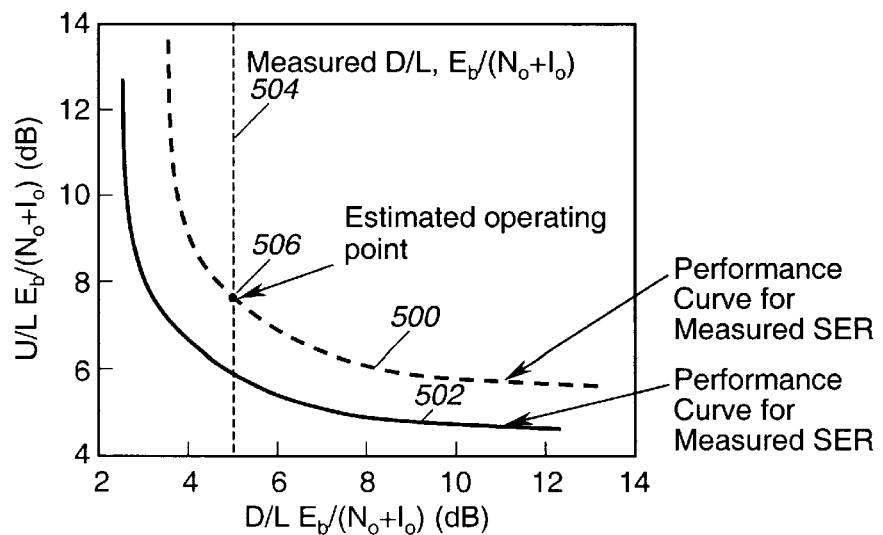
Figure 5. Measurement of Operating Point

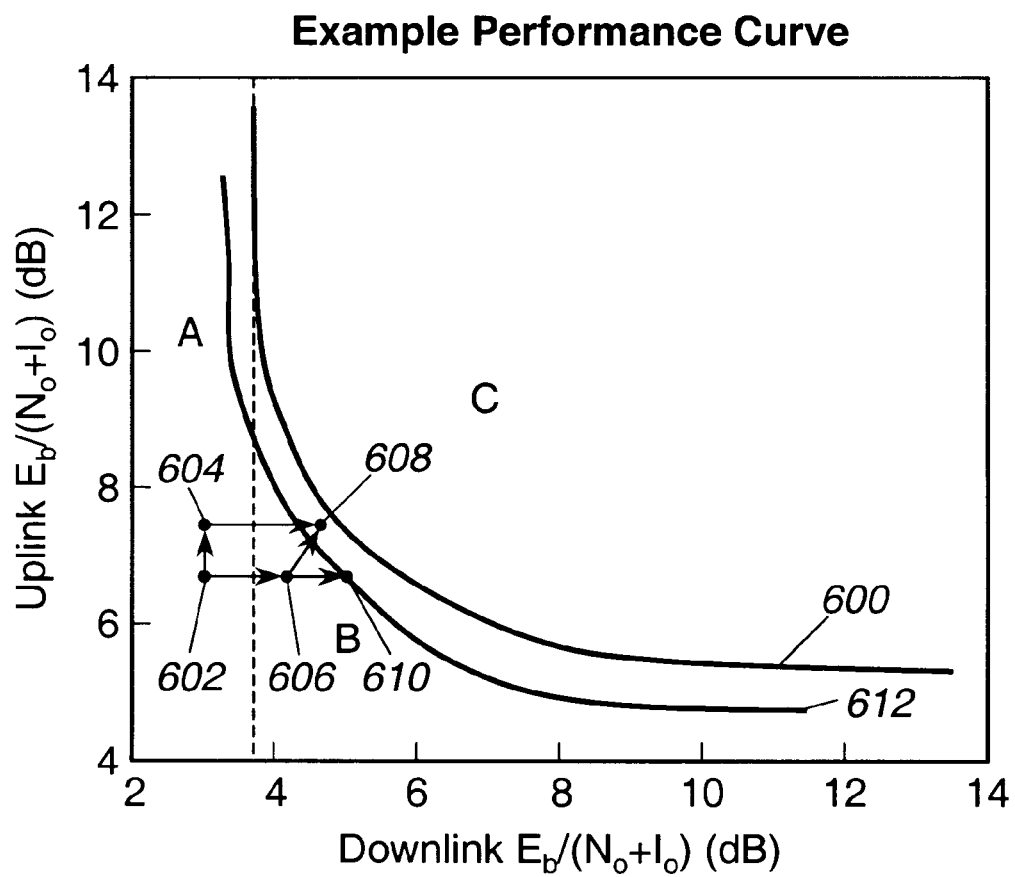
Figure 6. Operating Regions

METHOD FOR ENHANCING THE PERFORMANCE OF A REGENERATIVE SATELLITE COMMUNICATIONS SYSTEM

BACKGROUND OF THE INVENTION

The present invention relates to satellite communications techniques. More specifically, the invention relates to adaptively adjusting signal processing parameters such as ground station transmit power and uplink signal coding to meet a desired bit error rate at a destination ground station.

Modern communications networks carry staggering amounts of information and a portion of the information is often transmitted through a communications satellite. A single satellite may have, for example, the equivalent of 30 or more uplink transponders, each able to receive an uplink signal with a bandwidth of 250 MHz. The resultant uplink data path may have a capacity of 8 to 10 gigabits per second or more. Where a satellite is a link in the communications network, many individual ground stations may encode, modulate, and transmit uplink signals to the satellite. Each uplink signal may consist of hundreds of individual data channels, for example, carrying data for telephone conversations.

Because the uplink signals are susceptible to numerous sources of corrupting interference (for example, rain attenuation, scintillation loss, and multipath fading), the ground station applies error correcting codes to the uplink signal. Error correcting codes attempt to lower the Bit Error Rate (BER) of the information-carrying signal to acceptable levels. The BER is generally defined as the ratio of incorrectly received information bits to the total number of received information bits. A BER may be converted to an equivalent measure, the Symbol Error Rate (SER). The SER measures the ratio of incorrectly received symbols to the total number of received symbols (where a symbol is defined as a fixed number bits grouped together).

In many cases, a "concatenated" set of error correcting codes are applied to the data in order to lower the BER to acceptable levels. Concatenated coding refers to the sequence of coding (to be described below) in which a second coding operation is performed upon already encoded data. The "outer code" of the concatenated coding is the first code applied (the block code in the following description), while the "inner code" of the concatenated coding is the second code applied (the convolutional code in the following description). Alternatively, an additional block code may be used as the inner code (or a sequence of block codes (as the "inner" codes) may be used).

The first code the ground station applies is typically a block code. A codeword in a block code consists of k information bits, and r parity bits. The codeword is therefore n=k+r bits in length. A variety of block codes known as Reed-Solomon codes may be used to encode the uplink signals.

As noted above, block codes are generally organized on the basis of bits. Reed-Solomon block codes, however, are organized on the basis of groups of bits referred to as symbols. To form symbols, typically an incoming serial bit stream is stored as sequences of m individual bits (a symbol). The Reed-Solomon code has k information symbols (rather than bits), r parity symbols and a total codeword length of n=k+r symbols. For 8-bit symbols, a Reed-Solomon codeword is typically 255 symbols in length. Allowing the codeword to correct up to 16 symbols requires 32 parity symbols, thereby leaving 223 data symbols (for an effective code rate of 223/255 (approximately 7/8).

As part of the concatenated coding scheme, an additional level or levels of coding is applied by the ground station. For example, the ground station may further encode the block encoded uplink signals with a convolutional code to reduce the bit error rate (BER) associated with the uplink signal to even lower levels. A convolutional code is a type of error correcting code which transforms an input sequence of bits to an output sequence of bits through a finite-state machine, where additional bits are added to the data stream to allow for error-correcting capability. Typically the amount of error-correction capability is proportional to the amount of additional bits added and the memory present in the finite-state machine (encoder). The constraint length, K, of a convolutional code is proportional to the the encoder's memory and the rate of the convolutional code (e.g., m/n, with m<n describes how many additional bits are added for every m information bits (i.e., n−m bits are added for each group of m information bits)). The decoding complexity of a convolutional code increase exponentially with the constraint length.

Additional information on block codes and convolutional codes may be found, for example, on pages 166–175 in *The Communications Handbook*, (Jerry D. Gibson ed., IEEE Press 1997). Pages 166–175 of The Communications Handbook are incorporated herein by reference in their entirety.

Satellites receive the encoded uplink signals and transmit downlink beams to the ground stations. Before a satellite transmits a downlink beam, however, the satellite may perform various signal processing operations on the received uplink signal including demodulation, decoding, switching, and multiplexing. A system that demodulates an uplink signal and remodulates a downlink beam for transmission is referred to as a "regenerative" system.

For example, a satellite that demodulates uplink signals, decodes the signals, and recodes the signals is typically referred to as a "regenerative decode/recode" system or more simply "decode/recode". On the other hand, a satellite which simply forwards the received uplink signals unaltered (other than a frequency translation) to a ground station is typically referred to as a "bent pipe" system. In "(regenerative) end-to-end" coding, the satellite typically demodulates the uplink signal and remodulates the data for transmission in a downlink beam without decoding any of the coding on the uplink signal.

The downlink beams produced by the satellite and transmitted to ground stations often include data (often in Time Division Multiplexed (TDM) form) for hundreds of users (for example telephony users). Typically, the coding on the uplink signal is designed to cover the worst-case channel conditions (both uplink and downlink) likely experienced by the user at any given time. The worst case channel condition may be associated with an (infrequent) rain storm which causes significant signal interference, for example. In the past, the combination of the inner code and the outer code has been implemented using relatively large constraint length convolutional codes and long block codes to achieve downlink beam performance tailored to the worst case channel condition.

Most ground stations, however, do not experience the worst case channel condition at any given time. Furthermore, the satellite typically does not contain sufficient power or processing capability to completely decode the inner code and outer codes and adaptively recode the data for each ground station or individual channel condition. Furthermore, in some systems the desired BER may require joint selection of not only coding, but also transmit power level. For example, in a regenerative end-to-end coded system, the inner and outer codes are not decoded. In such a system, a non-trivial, irreducible relationship exists between the energy per bit to noise density ratios (Eb/No) on the uplink and downlink needed to provide a given, fixed BER to the destination ground station. Because of power and complexity constraints, the satellite may not be able to adaptively apply additional coding and transmit power and coding changes must be made at the originating ground station, regardless of which link (uplink or downlink) is experiencing a degraded channel condition.

Thus, in the past, bandwidth has been wasted by over-encoding the uplink signal and downlink beam with error correcting information that is not be needed by the ground station most of the time. Wasted bandwidth results in inefficient communication, reduced throughput, lost revenue, and wasted time and power for complex coding and decoding processing. Furthermore, past satellite links have not addressed the intertwined relationship between transmit power level and coding in order to more efficiently use available bandwidth.

For example, U.S. Pat. No. 4,261,054 to Scharia-Nelson, entitled "Real-time adaptive power control in satellite communications systems", describes a system in which the transmit power produced by a satellite is adjusted by adjusting the power in a signal which is transmitted to the satellite. The Scharia patent describes a system in which a ground station monitors received signal quality using a soft decision demodulator. When the ground station detects poor signal quality, it purposefully inserts errors in a return data stream so that the origination ground station responds by increasing its transmit power level. The Schiara patent, however, does not describe controlling the linked relationship between power level and coding to achieve a desired BER at a destination ground station.

As another example, U.S. Pat. No. 4,752,967 to Bustamante et al., entitled "Power Control System for Satellite Communications" discloses a system for compensating for varying attenuation of an uplink signal. The Bustamante patent generally describes monitoring a beacon signal, transmitted from a location with a low probability of rain, to measure the difference between the long term and short term average power of the received beacon downlink signal and another transmitted downlink signal. An error signal, based on the difference, controls a transmitter gain adjustment to compensate for uplink fading. The Bustamante patent, however, also fails to describe controlling the linked relationship between power level and coding to achieve a desired BER at a destination ground station.

A need has long existed in the industry for a performance enhancing satellite communications system, which overcomes the disadvantages discussed above and previously experienced.

BRIEF SUMMARY OF THE INVENTION

It is an object of the present invention to provide a method for enhancing the performance of a regenerative communication system.

It is another object of the present invention to allow an originating ground station to adaptively adjust transmit power to meet a desired BER at the destination ground station.

It is another object of the present invention to allow an originating ground station to adaptively adjust error control coding to meet a desired BER at the destination ground station.

It is yet another object of the present invention to provide power and coding adjustment feedback from a destination ground station to an originating ground station.

A further object of the present invention is to provide power and coding adjustment feedback to an originating ground station based upon measured downlink signal quality and estimated symbol error rate at a destination ground station.

The present invention provides a method for enhancing the performance of a communications system. An originating ground station, including a signal coder and a transmitter, transmits error control coded uplink signals in an uplink channel to a satellite. The satellite, in turn, transmits a downlink beam in a downlink channel which is received by a destination ground station.

The method includes the step of measuring a downlink signal quality indication. The signal quality indication may include, for example, the ratio Eb/No or Eb/(No+Io), where Eb is the transmitted energy per bit, No is the noise power spectral density, and Io is the interference power spectral density. In addition, the receiving ground station measures a symbol error rate (SER) or an equivalent bit error rate (BER) at the input to the outer code decoder (Reed-Solomon code or other block code with similar properties).

The ground station determines an operating point relative to a performance curve based on the quality indication and the symbol error rate. The performance curve may, for example, trace the relationship between uplink Eb/No (or Eb/(No+Io)) and downlink Eb/No (or Eb/(No+Io)) for a given BER. The destination ground station may use the operating point to determine whether a coding adjustment, a power adjustment, neither, or both (or a change to any other signal processing parameter) is appropriate for the originating ground station. The originating ground station changes its coding, transmit power, or both to produce adjusted uplink signals.

The adjusted uplink signals are again received by the satellite and forwarded to a destination ground station in a downlink beam. The destination ground station may therefore periodically determine an operating point and transmit coding and power adjustments to the originating ground station. The destination ground station may thereby conserve valuable power and bandwidth by adjusting the originating ground station uplink signals to meet a desired BER and avoid over-encoding or over-powering an uplink signal.

BRIEF DESCRIPTION OF THE SEVERAL VIEWS OF THE DRAWING

FIG. 1 illustrates the relationship between the required uplink Eb/(No+Io) and downlink Eb/(No+Io) for a fixed BER, for an example coding scheme applied to a regenerative satellite system.

FIG. 2 shows the relationship between the required uplink Eb/(No+Io) and downlink Eb/(No+Io) for a fixed BER and selected inner codes applied at an originating ground station.

FIG. 3 shows a block diagram of an originating ground station, satellite, and destination ground station.

FIG. 4 illustrates a flowchart of a power and coding adaptation algorithm which may be implemented at a destination ground station.

FIG. 5 shows an example of estimating an operating point based on a measured downlink Eb/(No+Io) and symbol error rate (SER).

FIG. 6 shows an example performance curve generally segmented into three areas which may be used to determine whether adaptive changes in power, coding, or both are appropriate at an originating ground station.

DETAILED DESCRIPTION OF THE INVENTION

FIG. 1 shows a fixed BER curve 100 delineating the uplink energy per bit (Eb) to noise plus interference power spectral density (No+Io) ratios required on the uplink and the downlink to produce a fixed BER at the destination ground station. The Eb parameter represents the amount of energy in a transmitted information bit, while (No+Io) represents the amount of noise and interference power spectral density. The plot in FIG. 1 is drawn assuming a fixed BER of $10^{-10}$ at a destination ground station. As an example, an uplink Eb/(No+Io) of 8 dB requires a downlink Eb/(No+Io) of approximately 4 dB(or more) to achieve a BER of $10^{-10}$. When the uplink and downlink operating point is above and to the right of the performance curve 100, the BER will be better (lower) than $10^{-10}$. On the other hand, if the uplink and downlink operating point is below or to the left of the BER curve 100, the BER will be worse (higher) than $10^{-10}$.

In general, the required uplink and downlink Eb/(No+Io) are dependent on the channel coding applied at the originating ground station and the type of decoding used at the destination ground station. FIG. 1 assumes that a concatenated coding scheme is used with a Reed-Solomon (255, 223) outer code, and a constraint length 7, rate 1/2 convolutional inner code. The effect of adapting the inner code of the concatenated coding scheme is shown in FIG. 2.

FIG. 2 illustrates several fixed BER curves 200–212. Each of the BER curves 200–212 delineates the uplink and downlink Eb/(No+Io) values required to achieve a BER of $10^{-10}$ at the destination ground station. The no-inner code BER curve 200 illustrates a scenario in which there is no inner code applied at the originating ground station. The remaining fixed BER curves 202–212 each illustrate constraint length 7 convolutional codes with varying rates. The rate of a convolutional code may be changed, for example, by puncturing a standard 1/n rate convolutional code. Puncturing removes regularly spaced code bits from the output of the convolutional encoder. For example, puncturing every other parity bit (every fourth bit in the output data stream which, if the code is systematic is two information bits and two parity bits of which one is removed) of a rate 1/2 code creates a rate 2/3 code. (The decoding of a punctured 1/n code uses a standard 1/m decoder, thus all of the codes in FIG. 2 use essentially the same decoder with only minor modifications.)

The fixed BER curves illustrated in FIG. 2 include a rate 7/8 curve 202, a rate 6/7 curve 204, a rate 5/6 curve 206, a rate 3/4 curve 208, a rate 2/3 curve 210, and a rate 1/2 curve 212. FIG. 2 shows that in general, as more coding is applied, the rate of the code decreases (because fewer bits are information bits), and the required uplink and downlink Eb/(No+Io) values needed to achieve a fixed BER are reduced. The fixed BER curves 200–212 in FIG. 2 assume a Reed-Solomon (255, 223) code is used as the outer code. A similar set of curves exists for each fixed BER and for each permutation of inner and outer code used in a concatenated coding scheme. As will be explained in more detail below, a destination ground station may used fixed BER curves generated for any fixed BER and coding scheme to adaptively change the power and coding of an originating ground station.

Turning now to FIG. 3, that figure shows an originating ground station 300 including a concatenated coding processing block diagram. The ground station 300 includes a Reed-Solomon encoder 302, a convolutional encoder 304, a modulator-transmitter 306, and a ground transmit antenna 308. Additionally, a Reed-Solomon Symbol-by-Reed-Solomon Symbol interleaver 303 may be provided. A satellite, generally indicated 310, receives the uplink signals transmitted from the ground transmit antenna 308.

The satellite 310 includes a receive antenna 312, a hard-decision demodulator 314, a switching network 316, a multiplexer-modulator-transmitter 318 as well as a transmit antenna 320. A destination ground station, generally indicated 326, receives the downlink beam transmitted from the transmit antenna 320.

The destination ground station 326 includes a receive antenna 328, a demodulator 330, a Viterbi decoder 332 and a Reed-Solomon decoder 334. Additionally, a Reed-Solomon Symbol-by-Reed-Solomon Symbol de-interleaver 333 may be provided. The destination ground station also includes a Signal to Noise Ratio (SNR) measurement device 338 and adaptation logic 340.

Referring again to the originating ground station 300, it employs a concatenated coding scheme using the Reed-Solomon encoder 302 and the convolutional encoder 304. The Reed-Solomon encoder 302 applies the outer code of the concatenated code to the input user data. The Reed-Solomon encoder 302 typically applies a relatively complex outer code, for example, a (255, 223) code. As noted above, a (255, 223) code produces 32 error protection symbols for every 223 information symbols, resulting in a block length of 255 symbols. Other relatively long block codes and Reed-Solomon codes are also suitable.

After the Reed-Solomon encoder 302 applies the outer code to the user data (and the Reed-Solomon Symbol-by-Reed-Solomon Symbol interleaver 303, if present, interleaves the output of the Reed-Solomon encoder 302), the convolutional encoder 304 applies an inner code to the user data. The Reed-Solomon encoder 302 and the convolutional encoder 304 thus function in concert to produce a concatenated coded uplink signal. As will discussed in more detail below, the convolutional encoder 304 provides adaptive error control coding for the uplink signal. The convolutional encoder 304 may apply, for example, a constraint length 7, rate 1/2 convolutional code. After applying the concatenated code to the uplink signal, the originating ground station 300 uses the modulator/transmitter 306 to modulate the uplink signal and transmit it through the transmit antenna 308. A wide variety of modulation schemes may be used, including Quadrature Phase Shift Keying (QPSK) and Binary Phase Shift Keying (BPSK).

Referring again to the satellite 310, the concatenated coded uplink signal is received on receive antenna 312 and demodulated by the demodulator 314. As noted above, an uplink signal may include dozens of individual data channels. After the satellite 310 has demodulated the uplink signal, the satellite 310 has direct access to the individual data channels in the uplink signal. The switching network 316 may, for example, operate on the individual data channels to switch all the data channels destined for a particular downlink beam into one of many internal satellite data streams. The switching network 316 may also group data channels by BER required at the destination ground station, priority, or by market driven criteria such as service cost or guaranteed minimum throughput. The resultant internal satellite data streams are provided to the multiplexer-modulator-transmitter 318 in order to generate a downlink beam with the transmit antenna 320.

Again with reference to FIG. 3, the destination ground station 326 receives downlink beams on the receive antenna 328 transmitted from the transmit antenna 320. A demodulator 330 removes any modulation applied by the multiplexer-modulator-transmitter 318. A Viterbi decoder 332 may be used to decode the convolutional code applied by the convolutional encoder 304. The Viterbi decoder 332 may be replaced by another suitable convolutional code decoder, for example, one using a sequential decoding algorithm.

After the Viterbi decoder 332 has decoded the inner code on the received downlink beam (and the Reed-Solomon Symbol-by-Reed-Solomon Symbol de-interleaver 333, if present, has de-interleaved the resulting data), the Reed-Solomon decoder 334 removes the outer code applied in the originating ground terminal 300. The original data channels are thereby recovered and may be forwarded to circuitry for additional processing or to actual ground base users (not shown). The destination ground station 326 also provides a SNR measurement device 338 which makes determinations concerning the signal quality of the received downlink beam.

The SNR measurement device 338 provides an estimate of the downlink Eb/(No+Io) at the destination ground station. An estimate for (No+Io) may be obtained, for example, by analyzing the signals received by the receive antenna 328 when the satellite is not transmitting a downlink beam (the downlink beam may include regularly scheduled time slots for just this purpose). An estimate for (Eb+No+Io) may then by obtained by analyzing the signals received by the receive antenna 328 when the satellite is transmitting a downlink beam. The estimate for Eb/(No+Io) may then be obtained as ((Eb+No+Io)/(No+Io))−1. The estimate for Eb/(No+Io) is provided to the adaptation logic 340 as a first piece of information used to generate an operating point estimate.

A second piece of information provided to the adaptation logic 340 is the SER at the input of the Reed-Solomon decoder 334. An estimate for the SER is obtained through the Reed-Solomon decoding process as a byproduct of its error correction algorithm. Essentially the Reed-Solomon decoder determines which symbols are incorrect, then corrects them; knowing which are incorrect allows estimation of the input SER. As noted above, the SER provides a measurement of the number of erroneous symbols received to the total number of symbols received. The SER can be converted to an equivalent BER (based on the mathematical model of the Reed-Solomon decoder), or the BER could be measured directly at the output of the Reed-Solomon decoder 334. A significant advantage lies in converting the SER to a BER, however. Because typical BERs are typically on the order of $10^{-10}$, the output of the Reed-Solomon decoder 334 would have to be monitored, on average, for 10,000,000,000 bit periods to find a single error. The SER corresponding to a BER of $10^{-10}$ is approximately on the order of $10^{-2}$, however. Therefore, measuring the SER may be accomplished in significantly less time than measuring the BER directly. Assuming a SER of $p_x$ at the Reed-Solomon decoder 334 input, the BER may be estimated from the bound shown below in Equation (1):

$$P_b < \frac{2^{K-1}}{2^K - 1} \sum_{j=t-1}^{n} \frac{j+t}{n} \binom{n}{j} p_x^j (1 - p_x)^{n-j} \quad (1)$$

In Equation (1), $P_b$ is the bound on the BER, assuming a t-symbol error-correcting Reed-Solomon code using K bit symbols of length n symbols. The factor $2^{K-1}/(2^K-1)$ accounts for the average number of information bit errors per symbol error. Additional information on the relationship between SER and BER may be found in Section 8.1.1 of Error-Correction Coding for Digital Communication (Clark and Cain, Plenum Pub. Corp 1981). Section 8.1.1 is incorporated herein by reference in its entirety.

The adaptation logic 340 uses the estimate for Eb/(No+Io) and the estimate for the BER (or Reed-Solomon input SER) to determine an operating point estimate. Turning now to FIG. 5, that figure shows one example of the determination of an estimated operating point. In FIG. 5, a measured SER curve 500 and a required SER curve 502 are shown. The required SER curve 502 represents an infinity of required operating points, any one of which provides an SER above which the system must operate. The SER curve 502 may be based on any number of factors including market driven criteria. The measured SER curve 500 is generated based on the known uplink and downlink Eb/(No+Io) operating points that yield that SER.

Note that the SER is used to define the curves 500 and 502 in FIG. 5, rather than the BER as used in FIGS. 1 and 2. Thus, a conversion between SER and BER (Equation (1)) need not take place when the performance curves are calculated based on SERs. The intersection of the measured SER curve 500 and the estimated Eb/(No+Io) curve 504 define the operating point 506 for the system. In FIG. 5, the operating point 506 is above and to the right of the required SER curve 502, indicating performance better than required.

Once the destination ground station 326 has determined the operating point 506, the destination ground station 326 may transmit changes in coding and transmit power back to the originating ground station 300. The transmit power and coding changes may, for example, move the operating point 506 closer to the required SER curve 502 in order to reduce the amount of power used by the originating ground station 300 or to reduce the amount of bandwidth used by coding at the originating ground station 300. A flowchart illustrating the general adaptation algorithm is shown in FIG. 4.

Starting at block 400 in FIG. 4, the adaptation algorithm obtains estimates, as described above, for the downlink Eb/(No+Io) and SER. Next, an estimate for the operating point is determined in block 402. In block 404, the estimated operating point determined in block 402 is compared against the required operating point. If the estimated operating point meets or exceeds the required operating point (measured in estimated BER), then processing continues at block 406. In block 406, the amount of coding or the transmit power level (or another appropriate signal processing parameter) is decreased at the originating ground station 300. The decrease may take the form of a predetermined decrement value for either the transmit power or coding level (to achieve, for example, changing the inner code convolutional code rate from 1/2 to 3/4). The decrease may be transmitted to the originating ground station 300 through a satellite on a data or control channel, or may be transmitted to the originating ground station 300 using a ground based network.

Processing continues again at block 400 and follows the loop described above until the estimated operating point does not meet the required operating point. Control then flows from block 404 to block 408, in which it is determined whether enough transmitter power is available at the originating ground terminal 300 to meet the required operating point. Additional detail on making the determination needed in block 408 is provided below. Assuming, however, that enough transmitter power is available, processing continues at block 410. In block 410, an increase in transmit power is communicated to the originating ground station 300. If enough transmitter power is not available, then processing continues at block 412. Block 412 causes an increase in the coding level to be communicated to the originating ground station 300 (for example, changing an inner code convolutional code rate from 3/4 to 1/2).

The flowchart shown in FIG. 4 selects an increase in transmitter power over an increase in coding when attempting to move an estimated operating point to the required operating point. The approach shown in FIG. 4 thus increases transmit power before relinquishing information bandwidth for coding bandwidth. An equally valid approach that may also be used is to increase coding before increasing transmit power, thus favoring low power usage over information bandwidth.

Turning now to FIG. 6, that figure shows an example performance curve 600 and three operating regions A, B, and C. (Also illustrated in FIG. 6 are a collection of operating points 602–610.) The performance curve 600 may represent, for example, the required SER curve 502 described above in connection with FIG. 5.

An increment in transmit power at the originating ground station 300 generally causes an increase in uplink Eb/(No+Io). The operating point changes accordingly, for example, from operating point 602 to operating point 604. Note that no increase in transmit power will enable the operating point 602 to reach the performance curve 600. This is true in general for all operating points in region A. Therefore, in block 408 of the flowchart illustrated in FIG. 4, if the destination ground station 326 finds that the estimated operating point lies in region A, a coding change, rather than a transmit power change is appropriate. Note also that a transmit power increase is not appropriate if the originating ground station is already transmitting at maximum power.

An increase in coding generally moves the performance curve 600 down and to the left (for example to 612). Additionally if the increase in coding is not accompanied by an increase in the coded bit rate transmitted by either the uplink ground station or within the downlink beam then less data (information) is transmitted per second and thus Eb/(No+Io) also increases on the uplink, downlink or both depending on transmission rates of uplink and downlink. For example, increasing the coding without changing the transmission rate (coded bit rate) of either the uplink or the downlink allocated to the user, will move the coding performance curve from 600 to 612 and, as an example, operating point 606 to 608. Similarly if the uplink transmission rate is changed proportionally to the change in coding (i.e., rate 3/4 to 1/2 changes the transmission rate by a factor of (3/4)/(1/2=1.5) then the operating point 602 may move to 610. A similar translation may occur if the downlink transmission rate allocated to the user is changed accordingly. Alternatively, the destination ground station 326 may transmit both a coding change and a transmit power charge simultaneously to the originating ground station 300 to move the operating point.

Referring again to FIG. 6, when the estimated operating point lies in region B, a transmit power change or a coding change will allow the operating point to shift to the performance curve 600. A determination that the estimated operating point lies in region B allows the originating ground station 300 to make modest increases in transmit power in order to move the operating point to curve 600. Note that a measurement of the SER only would not provide enough information to determine how much the transmit power should be increased to meet the performance curve 600. When the estimated operating point lies in region C, the destination ground station 326 may allow the originating ground station 300 to operate without coding or power changes (as the performance is already better than required), or may reduce either the coding or transmit power to move the operating point closer to the performance curve 600 (in order to save power or bandwidth).

One approach to determining an estimated operating point involves the direct measurement of the Signal to Interference & Noise (SINR) ratio at the satellite (for the uplink) and at the destination ground terminal 326 (for the downlink). In a system including numerous users (for example, telephony users), the SINR measurement becomes a complex, time consuming task. In addition, the measured SINR would have to be transmitted with the user data itself to the destination ground terminal 326 in order to determine what adaptation is necessary. For a large number of low-rate users, the amount of SINR measurement information becomes a substantial percentage of the total downlink data rate.

The present invention, however, avoids making numerous measurements at the satellite by making two separate measurements at the destination ground terminal 326. Because the measurements are all done on the ground, no additional complexity is necessary on the satellite and the downlink information rate is not reduced by carrying SINR measurements. The corresponding gain in bandwidth may be used to support additional users or more data per user thereby increasing revenue to the satellite operator. Because no measurement equipment is necessary on the satellite, the satellite is less complex and less expensive. Furthermore, establishing measurement capability at the destination ground station 326 allows the manufacturer of the destination ground station 326 to incorporate any signal measurement technique available now or in the future.

Another advantage of the present invention is that it is applicable to a system containing crosslinks between satellites. The hard decision demodulation employed on the crosslinks of a "regenerative" satellite system allows the uplink and crosslink to be combined into an "effective" uplink. The uplink/crosslink combination may be treated as an "effective" uplink because the hard decision demodulation errors occurring on the crosslink cannot be differentiated from any hard decision errors made on the uplink.

Note also that the invention allows the operating point to vary over virtually the entire range of a desired performance curve. In other words, the operating points that provide the exact BER exist at a multitude of uplink and downlink Eb/(No+Io) combinations rather than at a single point (as traced by the performance curve 600, for example). Thus, any combination of transmit power and coding change may be employed to achieve acceptable operating points, allowing the invention to adapt to situations in which, for example, the originating ground station 300 is power limited, coding limited, or both.

While particular elements, embodiments and applications of the present invention have been shown and described, it is understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for enhancing the performance of a communications system in which an originating ground station produces error-control coded uplink signals and transmits the coded uplink signals to a satellite and in which a destination ground station receives a downlink beam transmitted by said satellite including the coded uplink signals, the method comprising the steps of:

receiving uplink signals transmitted to a satellite by an originating ground station and transmitted by a satellite in a downlink beam to a destination ground station;

determining a downlink channel signal quality indication of said downlink beam at said destination ground station;

measuring an error rate associated with at least a portion of said uplink signals at said destination ground station;

determining an operating point relative to a desired performance curve based on said signal quality indication and said error rate;

adjusting at least an amount of error correction coding applied by said originating ground station to the uplink signal based on said operating point when said operating point lies in a predetermined region relative to said performance curve.

2. The method of claim 1 wherein said adjusting step includes changing the transmit power of said uplink signals.

3. The method of claim 1, wherein said step of measuring an error rate measures a symbol error rate, at the input to a decoder, at the destination ground station.

4. The method of claim 3, further comprising the step of calculating a bit error rate based in part on said symbol error rate.

5. The method of claim 1, wherein said step of determining a downlink channel quality indication determines a signal to noise ratio.

6. The method of claim 5, wherein said signal to noise ratio is $E_b/(N_o+I_o)$.

7. The method of claim 1, further comprising:

decreasing the amount of error correction coding at said originating ground station by a predetermined decrement value.

8. The method of claim 1, further comprising:

transmitting an amount of change in the error correction coding through the satellite over one of the data and control channels to said originating ground stations.

9. The method of claim 1 further comprising:

transmitting an amount of change in the error correction coding trough a ground based network to said originating ground station.

10. The method of claim 1, further comprising:

increasing an amount of error correction coding at said originating ground station by a predetermined incremental value.

11. The method of claim 1, further comprising:

determining an uplink power requirement of the received communications signal;

determining whether said originating ground station transmitting the communications signal has sufficient transmit power available to meet an uplink power requirement; and when said originating ground station has insufficient uplink power, increasing an amount of error correction coding applied to the data.

12. A method for controlling, in a communications system, signal quality of at least one of an uplink and a downlink between a satellite and ground stations, comprising:

transmitting error correction coded data in a communications signal over a downlink between a satellite and ground station;

measuring a signal quality of the received communications signal transmitted over said downlink between the satellite and ground station; and changing an amount of error correction coding applied to data in said communications signal transmitted by an originating ground station based on the measured signal quality.

13. The method of claim 12, further comprising:

decreasing the amount of error correction coding at an originating ground station by a predetermined increment value.

14. The method of claim 12, further comprising:

transmitting the change in the error correction coding through the satellite over one of data and control channels to an originating ground station.

15. The method of claim 12, further comprising:

transmitting the change in the error correction coding through a ground based network to an originating ground station.

16. The method of claim 12, further comprising:

increasing the amount of error correction coding at an originating ground station by a predetermined incremental value.

17. The method of claim 12, further comprising:

determining an uplink power requirement of the received communications signal;

determining whether an originating ground station transmitting the communications signal has sufficient transmit power available to meet the uplink power requirement; and when the originating ground station has insufficient uplink power, increasing an amount of error correction coding applied to the data.

* * * * *